Dec. 19, 1950　　　H. W. CARHART ET AL　　　2,534,229
METHOD AND APPARATUS FOR DETECTING HYDROGEN CYANIDE
Filed March 15, 1945
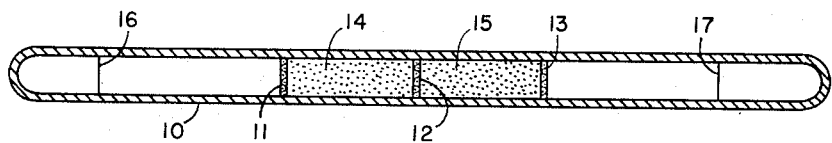
Inventor
HOMER W. CARHART
JOHN A. KRYNITSKY
By Ralph L. Chappell
Attorney Patented Dec. 19, 1950

2,534,229

UNITED STATES PATENT OFFICE 2,534,229

METHOD AND APPARATUS FOR DETECTING HYDROGEN CYANIDE

Homer W. Carhart and John A. Krynitsky, Washington, D. C.

Application March 15, 1945, Serial No. 582,965

15 Claims. (Cl. 23—232)

(Granted under the act of March 3, 1883, as amended April 30, 1928; 370 O. G. 757)

Our invention relates to the detection of hydrogen cyanide or hydrocyanic acid in admixture with air or other gases.

Under ordinary conditions, hydrocyanic or prussic acid is a light gas having an odor resembling that of bitter almonds. One of its best known properties is its extreme toxicity and for this reason it is frequently used as a fumigating agent. Another very common industrial application of cyanide compounds is in electro-plating work where solutions containing the cyanide radical are conventional. The slight hydrolysis and decomposition of these compounds in solution results in the contamination of the atmosphere in electro-plating room with appreciable concentrations of hydrocyanic acid.

In addition to the industrial uses of cyanide compounds, hydrocyanic acid itself has considerable value as a war gas. In spite of its volatility and, hence, its lack of persistency, it is very effective because of its extreme toxicity and lack of such action as lachrymation or irritation. It is a well established fact that many people cannot detect the odor of hydrocyanic acid even when it is present in the atmosphere in concentrations far exceeding lethal concentrations.

It is an object of our invention to provide a simple and convenient method of detecting contamination of the atmosphere or other gases with traces of hydrocyanic acid in amounts below lethal concentrations.

It is a second object of our invention to provide a device which can be used simply and easily to detect small concentrations of hydrocyanic acid in small samples of air or other gas.

It is another object of our invention to provide a colorimetric qualitative and semi-quantitative test apparatus and a composition for the detection of hydrocyanic acid and estimation of its concentration in a contaminated atmosphere.

A further object of our invention is to provide a method of preserving indefinitely chemical reagents which are subject to decomposition by contact with oxygen.

Other objects and advantages of our invention will in part be obvious and in part appear hereinafter.

Our invention comprises the composition, method and apparatus for preserving an oxygen-sensitive chemical and for detecting hydrocyanic acid by a sharp colorimetric reaction which will be described in detail and illustrated in the drawing accompanying this specification.

The drawing represents a longitudinal cross-section through a tube comprising the apparatus of our invention.

A satisfactory colorimetric reaction must be one which is, first, extremely sensitive, second, one which gives a very sharp color change which is readily distinguished, and, third, one which preferably takes place on a white background.

There are a number of reactions of hydrocyanic acid which will give color, among which is the reaction of hydrocyanic acid with alkaline sodium picrate to form iso-purpuric acid. As a test for the detection of hydrocyanic acid, this reaction is not particularly satisfactory for the color change involved is one in which yellow sodium picrate is converted to a reddish-brown iso-purpuric acid.

Hydrocyanic acid can also be made to react with cupric sulfide. However, the reaction is not a good colorimetric one for it involves the conversion of the black cupric sulfide to form white cuprous cyanide.

The reaction of the cyanide radical or hydrocyanic acid with iron salts to give ferri-ferrocyanide is very well known. However, it is too complicated for convenient field use.

We have discovered a method whereby the reaction of hydrocyanic acid with a cupric salt-organic aromatic amine reagent can be used for the qualitative and semi-quantitative detection of hydrocyanic acid. The reaction gives a sharp color change and possesses the advantage of being rapid, direct and quite specific for hydrocyanic acid. In the past the principal obstacle to the use of this type of reaction, that is, the cupric salt-organic aromatic amine reagent, for the detection of hydrocyanic acid was the instability of the various formulations. Short periods of exposure to traces of oxygen discolored the material so badly it was made useless for colorimetric work.

We have discovered that a cupric salt-aromatic amine combination which is highly sensitive to hydrocyanic acid and, consequently, can be used to detect micro-concentrations of hydrocyanic acid, can be stabilized and preserved so that the reagent once prepared and sealed into the apparatus will remain in operative condition for an indefinite period.

In general we have found that organic aromatic amines such as aniline, ortho-phenylenediamine, para-toluidine, para-phenetidine, diphenylamine, dimethylaniline, N-benzylaniline, phenyl-alphanaphthyl amine, bis-(p-methylaminophenyl) methane, Michler's ketone, dibenzylaniline, 4,4' - tetramethyldiaminotriphenylmethane, 4,4',4"-hexamethyltriaminotriphenylmethane, p-diethylaminodiphenylmethane, diphenylbenzidine and tetramethyldiaminodiphenylmethane, (or bis-(p-dimethylaminophenyl) - methane) are suitable for use in the colorimetric detection of hydrocyanic acid. Of these compounds tetramethyldiaminodiphenylmethane, diphenylamine and bis-(p-methylaminophenyl) methane were found most satisfactory for they gave very strong colors upon reaction with hydrocyanic acid which were respectively dark blue, a deep dirty green and deep purple. These compounds when together with a copper salt are unstable in the presence of oxygen and consequently cannot be used as such in detector units which are to be stored over long periods of time and kept in readiness for instant use.

Our method of providing for the preservation of hydrocyanic acid gas detecting compositions and the construction of the gas detection apparatus or unit involves inhibition of the inherent sensitivity of the amine-copper salt combination to oxidation and will be more clearly understood by reference to the drawing and to the following description and examples of the preparation of preservation and detection apparatus according to our invention.

Example I

The hydrocyanic acid sensitive reagent is preferably suspended on particles of silica gel or a like inert support. In the preparation of the gel, 1.5 grams of copper sulfate pentahydrate, $CuSO_4.5H_2O$, was dissolved in 100 milliliters of distilled water. To this solution 110 grams of iron-free silica gel screened to 40–60 mesh was added and the mixture stirred well to obtain a uniform impregnation of the gel. The impregnated silica gel was then placed in a vacuum oven and dried for 16 hours at about 85° C. and then for about 2 hours at 85° C. under a vacuum of 5–15 millimeters of mercury.

One-tenth of one gram (0.1) of tetramethyldiaminodiphenylmethane and 0.5 gram of salicylic acid were dissolved in 120 milliliters of chemically pure acetone. This solution was added to the dried gel as prepared above and the mixture stirred well to obtain a uniform impregnation of the gel with the solution of the reagent. Following this, the gel was dried at 65° C. for four hours and at 65° C. for about two hours under a pressure of 5–15 millimeters of mercury. The final product, silica gel impregnated with a small amount of copper sulfate, tetramethyldiaminodiphenylmethane and salicylic acid, was homogeneous and had a very faint greenish-blue cast.

A quantity of activated coconut charcoal was equilibrated with air at 40° C. and at 80% relative humidity, ground and sieved to mesh size of 40–60.

Referring now to the drawing, 10 represents a sealed container or tube. In the embodiment of the invention comprising a hydrocyanic acid detector tube, this would be a glass tube roughly three inches long and a few millimeters in diameter. A small cloth plug 11, a second cloth plug 12 and a third cloth plug 13 divide the tube into four sections, two end and two central sections. In the embodiment shown, a central section of the tube is filled with charcoal 14 and the adjacent section of the tube is filled with silica gel 15 impregnated with the copper salt-organic aromatic amine reagent. After the tube containing reagent and charcoal is sealed off it can be preserved substantially indefinitely with no deterioration in the appearance of the reagent or its sensitivity to hydrocyanic acid. Provision is made for breaking off the ends of the tube by putting scratches 16 and 17 a fraction of an inch from each end of the tube. Hydrocyanic acid is detected by passing contaminated gas through the tube, preferably over the reagent impregnated gel first. Immediately upon contact of the hydrocyanic acid contaminated gas with the reagent impregnated silica gel, the gel develops a blue color of intensity proportional to the hydrocyanic acid concentration in the gas. Using this test we have successfully detected quantities of hydrocyanic acid in air corresponding to concentrations of 25 micrograms per liter using as a sample only 200 milliliters of the contaminated air. This represents a detection of 5 micrograms of hydrocyanic acid.

Example II

The copper salt-organic amine reagent is prepared in substantially the same fashion as in Example I but there is added to the amine solution a red or pink dye, for example, Dupont TLA35 which is the product of diazotized anthranilic acid coupled with diethyl aniline, in a concentration of about 0.0001 per cent. The effect of the dye is to neutralize the bluish color of the copper and cause the reagent impregnated gel to have a white appearance (actually a very faint gray).

Example III

Fifty (50) grams of cupric salt impregnated silica gel support, prepared in substantially the same fashion as the support described in Example I, was impregnated with a solution consisting of 0.25 gram of diphenyl amine and 0.25 gram of salicylic acid in 60 milliliters of chemically pure acetone. The gel after impregnation with the solution was dried for two hours at 60° C. and then for an additional two hours at 60° C. and about 5 to 15 millimeters pressure. The reagent thus prepared was sealed into tubes in the same manner as that described in connection with Example I. This reagent is not as stable as the one described in Example I for a small amount of initial decomposition took place which was sufficient to discolor the gel very slightly and to give it a very pale green appearance. However, this slight discoloration did not interfere with its sensitivity as a hydrocyanic acid detector and upon exposure to air containing a trace of hydrocyanic acid it developed a very deep dirty green color.

Example IV

The gel impregnated with amine was prepared in the same fashion as the reagent described in Example III but the amine used was bis-(p-methylaminophenyl)-methane. In the preparation of detector units, sufficient decomposition occurred to give the final product a pale beige color which did not interfere with its value as a detector for upon test with hydrocyanic acid it gave a very deep purple color.

The ideal detecting reagent, like the ideal colorimetric reagent described above, is one which after preparation and sealing in a tube will remain white for an indefinite period. Frequently because of the inherent nature or instability of the reagents used this is impossible. The cupric salt used as a part of the detecting composition itself imparts a very pale bluish color to the sensitive composition. However, this is not objectionable and, if necessary, can be counteracted by the incorporation of a dye (Example II). The objectionable feature is actual decomposition of the organic amine-copper salt combinations, most of which are inherently unstable in the presence of oxygen. By the incorporation of an oxidation inhibitor such as salicylic benzoic, naphthoic or other similar aromatic acid on the gel together with the organic amine and, in addition, by the inclusion of a bit of activated charcoal within the detector unit itself, the actual decomposition of the amine can be inhibited to a great degree or prevented altogether. In the case of the tetramethyldiaminodiphenylmethane-copper sulfate combination the inhibition is substantially perfect. In the other cases the amine-copper salt combinations are considerably more unstable and a very small amount of deterioration of the reagent itself has to be tolerated. However, it is not sufficient to interfere with the use of the reagent as a detector.

Although the invention primarily provides a direct, qualitative, colorimetric test for the presence of hydrocyanic acid, it can easily be adapted to semi-quantitative colorimetric determinations. In such cases, that is, if it were to be used as a semi-quantitative test, the provision of standards established by developing a given intensity of color by drawing known quantities of hydrocyanic acid through substantially identical tubes, could provide a series of comparisons by which the concentrations of hydrocyanic acid in the air could be estimated.

As many apparently widely different embodiments of this invention in the selection of the reagents and the exact amount to be used and in the general size and form of the apparatus can be made without departing from the spirit and scope thereof, it is to be understood that we do not limit ourselves to the specific embodiments described in the above specification except as defined in the appended claims.

The invention described herein may be manufactured and used by or for the Government of the United States of America for government purposes without payment of any royalty thereon or therefor.

Having described our invention, what we claim as new and desire to secure by Letters Patent of the United States is:

1. The method of detecting the presence of hydrogen cyanide in a medium, comprising, disposing in the medium a sealed container having within it a quantity of activated charcoal and, separated therefrom, a quantity of reagent consisting essentially of a copper salt, a diaminodiphenylmethane and salicylic acid, and destroying the seal to bring said medium into contact with said reagent.

2. An article for detecting the presence of hydrogen cyanide, comprising a sealed, easily breakable container in which is disposed, a quantity of activated charcoal and, separated therefrom, a quantity of dried copper salt-diaminodiphenylmethane reagent containing in intimate admixture a small quantity of salicylic acid, said reagent being disposed on granules of an inert support material.

3. An article for detecting the presence of hydrogen cyanide, comprising, a sealed, easily breakable container in which is disposed, a quantity of activated charcoal and, separated therefrom, a quantity of dry copper salt-tetramethyldiaminodiphenylmethane reagent containing in intimate admixture a small quantity of salicylic acid, said reagent being disposed on granules of an inert support material.

4. An article for detecting the presence of hydrogen cyanide, comprising a sealed, easily breakable container in which is disposed, a quantity of activated charcoal and, separated therefrom, a quantity of dry copper salt-bis-(p-methylaminophenyl)-methane reagent containing in intimate admixture a small quantity of salicylic acid, said reagent being disposed on granules of an inert support material.

5. A process for the manufacture of a hydrogen cyanide sensitive detector, comprising, impregnating an inert support with a copper salt solution, drying said support, impregnating said copper salt impregnated support with a diaminodiphenylmethane and drying the support thus impregnated.

6. The method of detecting the presence of hydrogen cyanide in a medium, comprising, bringing said medium into contact with a previously sealed, freshly exposed material consisting essentially a copper salt-diaminodiphenylmethane-salicylic acid reagent.

7. The method of fabricating an indefinitely preservable hydrogen cyanide detector comprising, impregnating an inert granular support material with a copper salt solution, drying said material, impregnating said copper salt impregnated material with a solution of a diaminodiphenylmethane and salicylic acid, drying said thus impregnated material, disposing said dried granular material in a container, disposing near said material in said container a quantity of activated charcoal, and sealing off said container.

8. A process for the manufacture of a hydrogen cyanide sensitive detector comprising, impregnating an inert support with a copper salt solution, drying said support, impregnating said copper salt impregnated support with tetramethyldiaminodiphenylmethane, and drying the support thus impregnated.

9. The method of detecting the presence of hydrogen cyanide in a medium, comprising, disposing in the medium a sealed container having within it a quantity of activated charcoal and, separated therefrom, a quantity of copper salt-tetramethyldiaminodiphenylmethane reagent containing salicylic acid, and destroying the seal to bring said medium into contact with said reagent.

10. The method of detecting the presence of hydrogen cyanide in a medium, comprising, disposing in the medium a sealed container having within it a quantity of copper salt-tetramethyldiaminodiphenylmethane reagent containing salicylic acid, and destroying the seal to bring said medium into contact with said reagent.

11. The method of detecting the presence of hydrogen cyanide in a medium, comprising, bring said medium into contact with a previously sealed, freshly exposed material consisting essentially of a copper salt-tetramethyldiaminodiphenylmethane-salicylic acid reagent.

12. The method of detecting the presence of hydrogen cyanide in a medium, comprising, bring said medium into contact with a previously sealed, freshly exposed material consisting essentially of a copper salt-tetramethyldiaminodiphenylmethane-salicylic acid reagent, said previous sealing of said reagent being in the presence of activated charcoal.

13. An article for detecting the presence of hydrogen cyanide comprising a sealed, easily breakable container in which is disposed a quantity of dried copper salt-tetramethyldiaminodiphenylmethane reagent containing in intimate admixture a small quantity of salicylic acid, said reagent being disposed on granules of an inert support material.

14. The method of fabricating an indefinitely preservable hydrogen cyanide detector comprising, impregnating an inert granular support material with a copper salt solution, drying said material, impregnating said copper salt impregnated material with a solution of tetramethyldiaminodiphenylmethane and salicylic acid, drying said thus impregnated material, disposing said dried granular material in a container, disposing near said material in said container a quantity of activated charcoal, and sealing off said container.

15. The method of fabricating an indefinitely preservable hydrogen cyanide detector comprising, impregnating an inert granular support material with a copper salt solution, drying said material, impregnating said copper salt impregnated material with a solution of tetramethyldiaminodiphenylmethane and salicylic acid, drying said thus impregnated material, disposing said dried granular material in a container, and sealing off said container.

HOMER W. CARHART.
JOHN A. KRYNITSKY.

REFERENCES CITED

The following references are of record in the file of this patent:

UNITED STATES PATENTS

| Number | Name | Date |
|---|---|---|
| 1,321,062 | Lamb and Hoover | Nov. 4, 1919 |
| 1,537,519 | Yablick | May 12, 1925 |
| 1,595,788 | Kerschbaum | Aug. 10, 1926 |
| 1,684,587 | Hultman | Sept. 18, 1928 |
| 1,789,194 | Rockwell | Jan. 13, 1931 |
| 2,054,885 | Schroter | Sept. 22, 1936 |
| 2,176,462 | McAllister | Oct. 17, 1939 |
| 2,234,499 | McAllister | Mar. 11, 1941 |
| 2,321,762 | McDermott | June 15, 1943 |
| 2,345,219 | Sanderson | Mar. 28, 1944 |

FOREIGN PATENTS

| Number | Country | Date |
|---|---|---|
| 431,809 | Great Britain | July 16, 1935 |
| 496,345 | Great Britain | Nov. 29, 1938 |
| 519,957 | Great Britain | Apr. 10, 1940 |

OTHER REFERENCES

Hoogeveen: The Detection of Small Quantities of War Gas (Dijkstra's Method); J. Soc. Chem. Ind. 59, vol. 18 (1940), pages 550–560.

Jacobs, Morris B.: The Analytical Chemistry of Industrial Poisons, Hazards and Solvents; Interscience Publ., Inc., New York City (1941), page 348.

Neidig et al., Drug and Cosmetic Industry, vol. 54 (1944), pages 408–410 and 481–489.